(12) United States Patent
Onasch et al.

(10) Patent No.: US 10,928,245 B2
(45) Date of Patent: Feb. 23, 2021

(54) LIGHT MEASUREMENT USING AN AUTONOMOUS VEHICLE

(71) Applicant: Siteco GmbH, Traunreut (DE)

(72) Inventors: Torsten Onasch, Saaldorf-Surheim (DE); Dorian Jack Spero, Reading, MA (US)

(73) Assignee: Siteco GmbH, Traunreut (DE)

( * ) Notice: Subject to any disclaimer, the term of this patent is extended or adjusted under 35 U.S.C. 154(b) by 222 days.

(21) Appl. No.: 15/705,106

(22) Filed: Sep. 14, 2017

(65) Prior Publication Data

US 2018/0073918 A1 Mar. 15, 2018

Related U.S. Application Data

(60) Provisional application No. 62/395,311, filed on Sep. 15, 2016.

(51) Int. Cl.
| | |
|---|---|
| *G01J 1/02* | (2006.01) |
| *G01J 1/42* | (2006.01) |
| *G05D 1/00* | (2006.01) |
| *B64C 39/02* | (2006.01) |
| *G08G 5/00* | (2006.01) |

(52) U.S. Cl.
CPC .......... *G01J 1/0266* (2013.01); *B64C 39/024* (2013.01); *G01J 1/4204* (2013.01); *G05D 1/0094* (2013.01); *B64C 39/02* (2013.01); *B64C 2201/027* (2013.01); *B64C 2201/12* (2013.01);
(Continued)

(58) Field of Classification Search
CPC .... G01J 1/0266; G01J 1/02; G01J 1/00; G01J 1/4204; G01J 1/42; G01J 2001/0257; G05D 1/0094; G05D 1/02; G05D 1/0202; G05D 1/0206; G05D 1/021; G05D 1/0212; G05D 1/0221; G08G 5/0034; G08G 5/0069; B64C 39/024; B64C 39/02; B64C 39/028; B64C 2201/027; B64C 2201/024;
(Continued)

(56) References Cited

U.S. PATENT DOCUMENTS

| | | | | |
|---|---|---|---|---|
| 9,651,390 B1 * | 5/2017 | Thompson | ............. | G01C 21/32 |
| 2014/0297227 A1 * | 10/2014 | Barnard | ................... | G01J 1/42 |
| | | | | 702/189 |

(Continued)

FOREIGN PATENT DOCUMENTS

WO 2013177059 A1 11/2013

OTHER PUBLICATIONS

International Search Report issued for the corresponding PCT application No. PCT/US2017/051932, dated Feb. 21, 2018, 3 pages (for informational purpose only).

*Primary Examiner* — John R Lee
(74) *Attorney, Agent, or Firm* — Viering, Jentschura & Partner MBB

(57) ABSTRACT

Systems, methods, and software to acquire light measurements in a targeted space using an autonomous vehicle, such as an aerial drone, are provided. Examples of targeted spaces include, but are not limited to, stadiums, arenas, racetracks, fields, parking lots, etc. Uses of such systems, software, and/or methods include, but are not limited to, verifying that required light intensity, distribution, camera image quality, and/or other performance metrics are met when commissioning, changing, checking, and approving lighting systems, among other things.

24 Claims, 6 Drawing Sheets

(52) U.S. Cl.
CPC .... *G01J 2001/0257* (2013.01); *G08G 5/0034* (2013.01); *G08G 5/0069* (2013.01)

(58) Field of Classification Search
CPC ............ B64C 2201/02; B64C 2201/12; B64C 2201/123; B64C 2201/127
See application file for complete search history.

(56) References Cited

U.S. PATENT DOCUMENTS

| | | | |
|---|---|---|---|
| 2015/0035437 A1 | 2/2015 | Panopoulos et al. | |
| 2015/0094952 A1* | 4/2015 | Moeglein | H04W 4/029 701/491 |
| 2015/0173147 A1* | 6/2015 | Casper | G09G 3/3413 315/152 |
| 2015/0234055 A1* | 8/2015 | Ashjaee | G01C 11/02 701/2 |
| 2015/0261217 A1* | 9/2015 | Gil | G05D 1/0038 701/2 |
| 2015/0312774 A1* | 10/2015 | Lau | H04W 16/20 455/446 |
| 2015/0334807 A1* | 11/2015 | Gordin | H05B 37/0218 315/152 |
| 2016/0004795 A1* | 1/2016 | Novak | G06F 17/5009 703/1 |
| 2016/0049081 A1* | 2/2016 | Ohtomo | G08G 5/0069 701/2 |
| 2016/0050360 A1* | 2/2016 | Fisher | G03B 17/561 348/207.11 |
| 2016/0069741 A1* | 3/2016 | Ritter | G01J 3/0297 356/402 |
| 2016/0070265 A1* | 3/2016 | Liu | B64C 39/024 701/3 |
| 2016/0073470 A1* | 3/2016 | Casper | G09G 3/3413 315/153 |
| 2016/0073475 A1* | 3/2016 | Klein Swormink | H05B 37/0272 315/151 |
| 2016/0227634 A1* | 8/2016 | Engelen | H05B 37/0245 |
| 2017/0238396 A1* | 8/2017 | Knibbe | H05B 33/0854 315/151 |
| 2017/0257547 A1* | 9/2017 | Safarik | B64D 47/08 |
| 2018/0067493 A1* | 3/2018 | Pilskalns | G05D 1/0094 |
| 2018/0073918 A1* | 3/2018 | Onasch | G01J 1/0266 |
| 2018/0164157 A1* | 6/2018 | Pedersen | G01J 1/0403 |

* cited by examiner

LIGHT MEASUREMENT USING AN AUTONOMOUS VEHICLE

CROSS-REFERENCE TO RELATED APPLICATION

The present application claims benefit of priority of U.S. Provisional Application No. 62/395,311, filed Sep. 15, 2016, the entire contents of which are hereby incorporated by reference.

TECHNICAL FIELD

The present invention relates to lighting, and more specifically, to light measurement using an autonomous vehicle.

BACKGROUND

Measuring light levels in a stadium can be critical for several reasons. In the case of a televised sporting event, the ground needs to be properly lit for player visibility, viewing by the attending audience and television cameras. Light level measurements can indicate whether the playing surface is sufficiently illuminated and the light is distributed as required (that is, for uniform distribution, there are no aberrational bright or dark spots). These measurements can also be used to differentiate between issues with the lighting system and ground. For example, what may visually appear from the grandstand as a bright spot on the ground, may in fact be a patch of dry grass or the result of improper mowing.

The measurement process is especially pertinent during the lighting system setup/commissioning phase to verify lighting design and positioning. It is also applicable when the lighting system is changed/upgraded and for routine servicing, testing and verification. Lighting requirements may also need to be verified before approval for certain events. For example, the National Collegiate Athletic Association (NCAA) in the U.S.A. publishes Best Lighting Practices for different sports that need to be verified and approved for televised events. Additionally, the Federation Internationale de Football Association (FIFA) publishes lighting specifications for both televised and non-televised soccer events.

Light level measurements are typically performed manually. A portable light meter, typically measuring in units of foot-candle or lux, is positioned on, or close to, the ground and pointed up towards the sky, lighting system and/or cameras to measure incident light. Measurements are typically performed at multiple positions to ascertain light distribution in addition to the intensity of illumination at any given point.

SUMMARY

Embodiments are directed to systems, methods, and software for using one or more fully or semi-autonomous vehicles (for simplicity, "autonomous vehicle(s)") to make measurements of lighting conditions in targeted space, such as a stadium, an arena, a sports field, a parking lot, an amusement park, a swimming pool, and an aquarium tank, among many other types of spaces. Fundamentally, there is no limitation on the nature and character of the targeted space, other than the fact that it can be traversed by one or more autonomous vehicles. Uses of such systems, software, and/or methods include, but are not limited to, verifying that required light intensity, distribution, camera image quality, and/or other performance metric(s) is/are met when commissioning, changing, checking, and approving lighting or other systems, among other things. Examples of autonomous vehicles that can be used in conjunction with light-measurement systems and methods disclosed herein include, but are not limited to, unmanned aerial vehicles (such as drones), terrestrial robots and unmanned terrestrial vehicles, and unmanned underwater vehicles, among others. Benefits of making light measurements may include, but are not limited to, collecting light-measurement data quicker than conventional methods and reducing the number of people needed to execute a light-measurement plan, thereby making the process more efficient.

In an embodiment, there is provided a method of taking light-measurement readings within a targeted space. The method includes: receiving, for deployment of an autonomous vehicle having a light-measuring sensor, a light-measuring plan that includes an identification of a plurality of measurement positions for the autonomous vehicle in the targeted space; causing the autonomous vehicle to automatically move to each of the measurement positions based on the light-measuring plan; causing the light-measuring sensor to capture the light measurement at each of the measurement positions while the autonomous vehicle is at the corresponding one of the measurement positions based on the light-measuring plan; and storing, for each measurement position, the light measurement taken at that position and information identifying that position.

In a related embodiment, the targeted space may have a lighting specification that includes the plurality of measurement locations and a corresponding target light-measurement value at each of the measurement locations. In a further related embodiment, the method may further include automatically comparing each light measurement taken to the corresponding target light-measurement value. In another further related embodiment, the targeted space may be a playing field, and the lighting specification may be a FIFA lighting specification.

In another related embodiment, the autonomous vehicle may include an aerial vehicle and the light-measuring plan may include a flight path for the aerial vehicle that traverses a path that includes the plurality of measurement positions. In yet another related embodiment, the autonomous vehicle may include a terrestrial vehicle and the light-measuring plan may include a terrestrial route that traverses a path that includes the plurality of measurement positions. In still another related embodiment, the autonomous vehicle may include a watercraft and the light-measuring plan may include a water-based route that traverses a path that includes the plurality of measurement positions.

In yet still another related embodiment, the method may further include moving the autonomous vehicle to each of the measurement positions using realtime positioning information. In still yet another related embodiment, the method may further include moving the autonomous vehicle to each of the measurement positions based on a local positioning reference.

In still another related embodiment, the method may further include controlling at least one of the autonomous vehicle and a movable mount to achieve an aim for light-measuring sensor. In yet another related embodiment, the light-measuring plan may include a path traversing the measurement positions, and the method may further include determining the path based on a deployment of the autonomous vehicle prior to executing the light-measuring plan.

In another embodiment, there is a non-transitory machine-readable storage medium containing machine-executable instructions configured to cause a processor of a light-measurement system to perform operations including: receiving, for deployment of an autonomous vehicle having a light-measuring sensor, a light-measuring plan that includes an identification of a plurality of measurement positions for the autonomous vehicle; causing the autonomous vehicle to automatically move to each of the measurement positions; causing the light-measuring sensor to automatically capture the light measurement at each of the measurement positions while the autonomous vehicle is the corresponding one of the measurement positions; and storing, for each measurement location, the light measurement taken at that position and information identifying that position.

In a related embodiment, the targeted space may have a lighting specification that includes the plurality of measurement locations and a corresponding target light-measurement value at each of the measurement locations. In a further related embodiment, the operations may further include automatically comparing each light measurement taken to the corresponding target light-measurement value. In another further related embodiment, the targeted space may be a playing field, and the lighting specification may be a FIFA lighting specification.

In another related embodiment, the autonomous vehicle may include an aerial vehicle and the light-measuring plan may include a flight path for the aerial vehicle that traverses a path that includes the plurality of measurement positions. In still another related embodiment, the autonomous vehicle may include a terrestrial vehicle and the light-measuring plan may include a terrestrial route that traverses a path that includes the plurality of measurement positions. In yet another related embodiment, the autonomous vehicle may include a watercraft and the light-measuring plan may include a water-based route that traverses a path that includes the plurality of measurement positions.

In still yet another related embodiment, the operations may further include causing the autonomous vehicle to move to each of the measurement positions using realtime positioning information. In yet still another related embodiment, the operations may further include causing the autonomous vehicle to move to each of the measurement positions based on a local positioning reference.

In still another related embodiment, the operations may further include controlling at least one of the autonomous vehicle and a movable mount to achieve an aim for light-measuring sensor. In yet another related embodiment, the light-measuring plan may include a path traversing the measurement positions and the operations may further include determining the path based on a deployment of the autonomous vehicle prior to executing the light-measuring plan.

In another embodiment, there is provided a light-measuring system to take light measurements within a targeted space. The system includes: an autonomous vehicle that includes locomotion system capable of moving the autonomous vehicle so that it traverses a path that includes measurement positions within the targeted space; a light-measuring sensor deployed on the autonomous vehicle to acquire the light measurement at each of the measurement positions; and a measurement-plan system configured to implement a measurement plan for acquiring the light measurements at the measurement positions, the measurement-plan system including: navigation instructions configured to cause the locomotion means to move the autonomous vehicle so that it traverses the path; and sensor instructions configured to cause the light-measuring sensor to capture the light measurement at each of the measurement positions.

In a related embodiment, the autonomous vehicle may include an aerial vehicle, and the locomotion system may include hovering capability. In another related embodiment, the autonomous vehicle may include a terrestrial vehicle. In yet another related embodiment, the autonomous vehicle may include a watercraft.

In still another related embodiment, the autonomous vehicle may further include a global positioning system receiver, and the navigation instructions may cause the locomotion system to move the autonomous vehicle so that it traverses the path based on global positioning system information acquired by the global positioning system receiver. In yet still another related embodiment, the autonomous vehicle may further include a positioning system that permits the autonomous vehicle to identify each measurement position based on a local positioning reference. In still yet another related embodiment, the light-measuring sensor may be movably mounted to the autonomous vehicle, and the sensor instructions may include instructions to move the light-measuring sensor relative to the autonomous vehicle.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Figure 1:
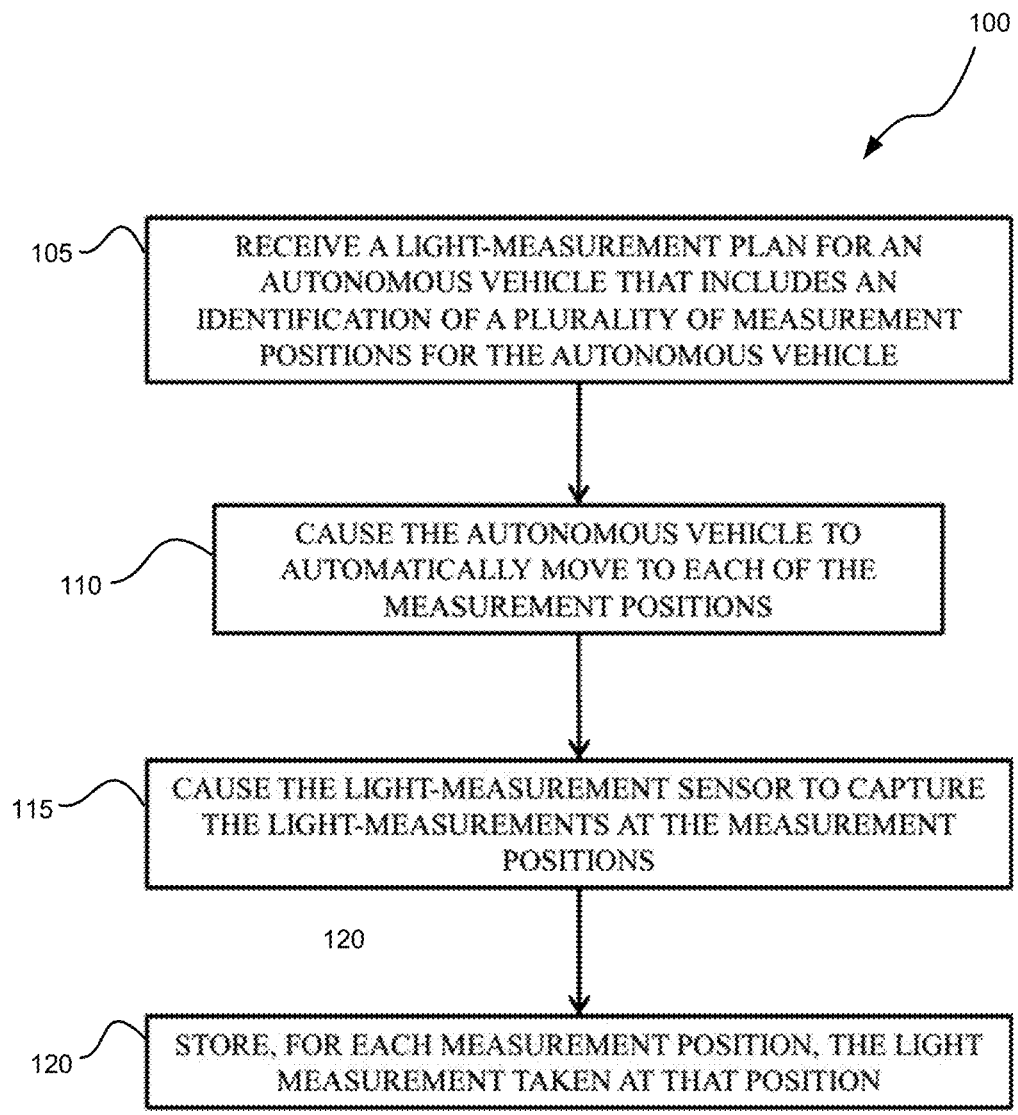
FIG. 1 is a flow diagram illustrating a method of taking light measurements within a targeted space according to embodiments disclosed herein.

FIG. 1 illustrates an example light-measuring method 100 in accordance with aspects of the present disclosure. In general, light-measuring method 100 provides a method of making light measurements at a plurality of locations within a targeted space, which, as noted above, can be any indoor or outdoor space in which it is desired to collect light-measurement data. It is noted that the nature of the light measurements is not limited in any manner and may be any type of light measurement, such as a photometric measurement, a radiometric measurement, or a spectrographic measurement, among others. It is also noted that more than one type of light measurement can be taken at each of the plurality of locations and that the type of reading(s) can vary among the plurality of locations within any given targeted space. Method 100 may be implemented using any suitable autonomous-vehicle-based light-measurement system, such as autonomous-vehicle-based light-measurement system 200 of FIG. 2. For the sake of illustration, method 100 is described in the context of autonomous-vehicle-based light-measurement system 200. Consequently, references will be made to FIG. 2 as well as FIG. 1. To assist the reader, all 100-series numerals in the following description refer to FIG. 1, and all 200-series numerals refer to FIG. 2. Those skilled in the art will understand that the references to autonomous-vehicle-based light-measurement system 200 relative to method 100 is merely for convenience and is not intended to limit the scope of the method.

At step 105, a light-measurement plan 204 for an autonomous-vehicle-based light-measurement system, here, autonomous-vehicle-based light-measurement system 200 is received. In this example, autonomous-vehicle-based light-measurement system 200 includes an autonomous vehicle 208, a light-measuring sensor 212 mounted to the autonomous vehicle, and a measurement-plan system 216 that is in communication with the autonomous vehicle and, either directly or indirectly, with the light-measuring sensor. As noted above, autonomous vehicle 208 may be any suitable fully or semi-autonomous vehicle, depending on the targeted space in which the autonomous vehicle will collect light-measurement data 220. As also noted above, light-measuring sensor 212 may be any suitable light-measuring sensor, such as a light sensor suitable for any one or more desired photometric, radiometric and spectrographic measurements, among others. Again, the singular "light-measuring sensor" is intended to encompass a plurality of light-measuring sensors of the same or differing type. Light-measuring sensor 212 may be fixedly or movably mounted to autonomous vehicle 208 in any suitable manner. Regarding movable mounts, such mounts may include rotational mounts, gimbaled mounts, and robotic arm mounts, among others.

Figure 2:
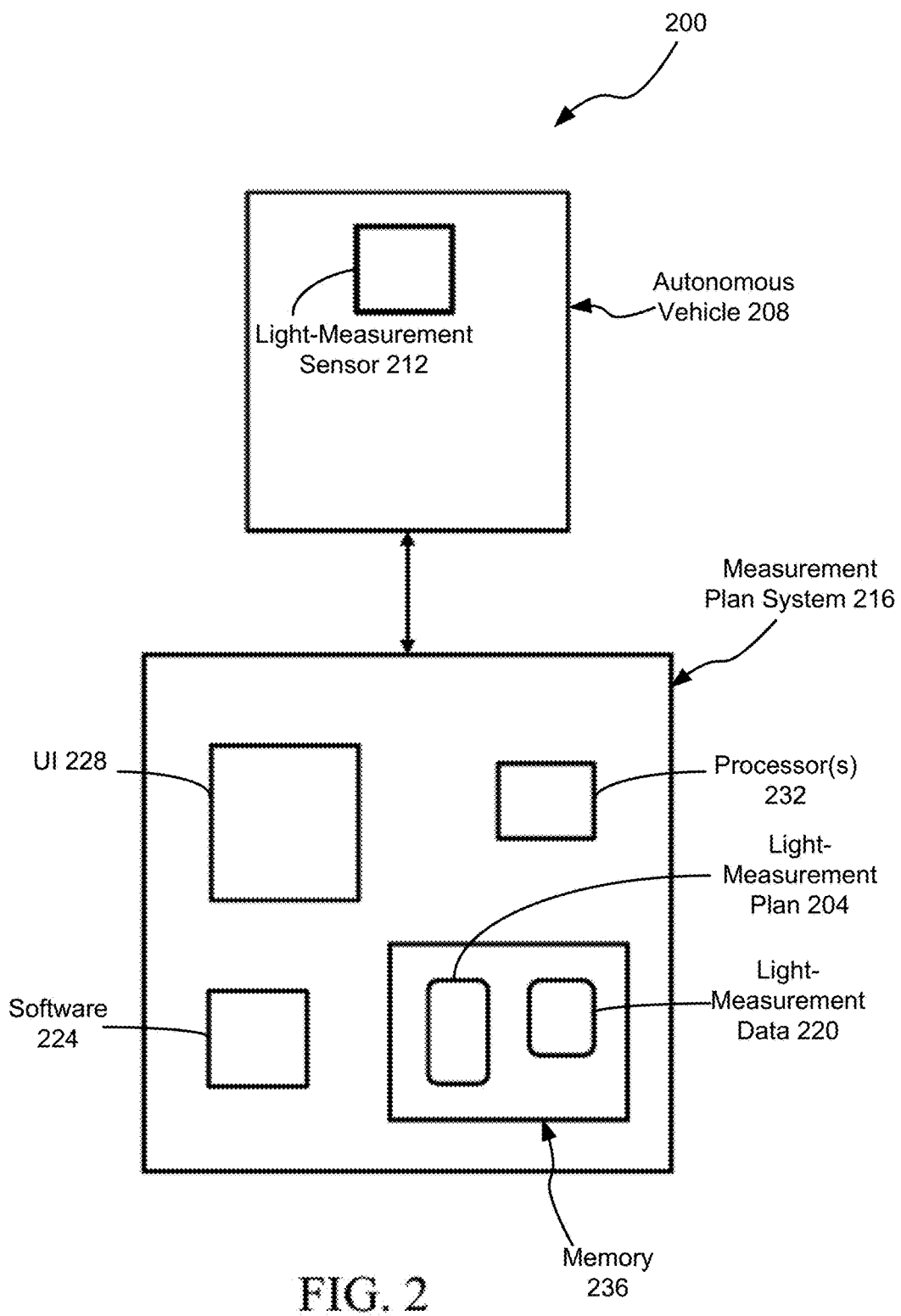
FIG. 2 is a high-level block diagram of an autonomous-vehicle-based light-measurement system that can be used to perform a method according to embodiments disclosed herein.

Measurement-plan system 216 may include any collection of software and hardware that provides the requisite functionality. As those skilled in the art will readily appreciate, measurement-plan system 216 may be embodied in any of a wide variety of forms; consequently, the hardware and software required will vary greatly among at least some of these forms. It is noted that while FIG. 2 illustrates measurement-plan system 216 as being separate and distinct from autonomous vehicle 208, this is in terms of functionality and not physical construct. Indeed, and as described below, one or more portions, or even the entirety, of measurement-plan system 216 may be physically integrated into autonomous vehicle 208. Following are some example forms that measurement-plan system 216 can take. However, these examples are not exhaustive and are not intended to cover every possibility. That said, those skilled in the art will be able to derive other embodiments using these examples and other information contained in this disclosure without undue experimentation.

Generally, the form that measurement-plan system 216 takes can depend on the on-board computing power of autonomous vehicle 208 and the robustness of its user interface 228. For example, if autonomous vehicle 208 contains the entirety of software 224 and has a robust user interface 228 that allows a user to directly input light-measurement plan 204 directly into the autonomous vehicle, then the entire light-measurement-plan system 216 may reside on the autonomous vehicle primarily in the form of one or more computer processors 232, the user interface, and the corresponding software. However, if autonomous vehicle 208 is configured, for example, to only have enough onboard computing power to receive and execute a vehicle-specific instruction set received from an external device, then light-measurement-plan system 216 will have more of software 224 and hardware external to the autonomous vehicle. For example, user interface 228 and portions of software 224 responsible for receiving light-measurement-plan 204, compiling the light-measurement plan into vehicle-specific instructions, and providing the vehicle-specific instructions to autonomous vehicle 208, may reside on a suitable external device (not shown), such as a laptop computer, desktop computer, smartphone, and application-specific device, among others.

Light-measurement plan 204 includes an identification of a plurality of vehicle positions for autonomous vehicle 208 to traverse so as to allow the autonomous vehicle to take light measurements at a plurality of light-measurement locations. The light-measurement locations may be user-selected locations or locations prescribed by a light-measurement standard, or a combination thereof. The light-measurement locations may have a dimensionality of one (linear), two (planar), or three (volume) dimension(s). For example, for a 3-D dimensionality and using Cartesian space, each light-measurement location will have x, y, and z coordinates. Each light-measurement location may also have one or more light-sensor directionalities associated therewith. For example, if light-measurement sensor 212 is directional, i.e., must be aimed in a particular direction, the light-measurement plan 204 will include information for autonomous vehicle 208 and/or other mechanism to properly aim the light-measurement sensor while at a particular measurement location.

Depending on whether or not autonomous vehicle 208 can move freely in 3D space, such as with an aerial drone or underwater vehicle, each corresponding light-measurement position of the autonomous vehicle, will have, for example, either x, y, and z coordinates or x and y coordinates (such as on a horizontal grid), with the z-coordinate (vertical) of the light-measurement location being satisfied by a height of the autonomous vehicle and/or height of light-measuring sensor 212. Light-measurement plan 204 may also include other information, such as one or more paths for autonomous vehicle 208 to traverse to hit all of the light-measurement locations, directionality of light-measuring sensor 212 for acquiring a light measurement, an offset distance and/or direction of the light-measurement sensor from the origin of the axes assigned to autonomous vehicle 208, information for instructing the light-measuring sensor to take light measurements, and, if the light-measuring sensor is movably mounted to autonomous vehicle 208, information for controlling motion of the light-measuring sensor relative to the autonomous vehicle.

At step 110, autonomous vehicle 208 is caused to move to each of the light-measurement positions, for example, by traversing one or more planned movement paths for the autonomous vehicle. Such causation may be brought about in any of a variety of ways. For example, a movement path may be programmed directly into autonomous vehicle 208 as part of the light-measurement plan if the autonomous vehicle is provided with such functionality or it may be downloaded into the autonomous vehicle from an external device as an instruction set, and the autonomous vehicle may then be triggered to execute the instruction set using any suitable input(s), such as global positioning information or local positioning information, among other things. In some embodiments, movement of autonomous vehicle 208 may be effected by realtime communication between the autonomous vehicle and a remove vehicle controller (not shown, but see FIG. 5), which may be fully automated or involve user interaction. As an example of the former, an off-board movement controller may use one or more video cameras or other sensors to observe the movement of autonomous vehicle 208 and control movements of the autonomous vehicle using information from such observations and knowledge of the light-measurement locations. As an example of the latter, a user may operate a controller that displays, in realtime, the location of autonomous vehicle 208 and the locations of the light-measurement locations to the user and then allows the user to remotely control movements of the autonomous vehicle based on that visual input. Other manners of performing step 110 are possible.

At step 115, light-measurement sensor 212 is caused to capture the light measurements when autonomous vehicle 208 is at the measurement positions. As those skilled in the art will readily appreciate, step 115 can be performed in any suitable manner. For example, step 115 can be accomplished automatically via a suitable control instruction set that causes autonomous vehicle 208 to make a measurement each time the autonomous vehicle is located at or proximate to, within a preset tolerance, a corresponding measurement position. As another example, when control is by a user using, for example, a remote controller to operate autonomous vehicle 208 and/or light-measuring sensor 212, step 115 may be effected by the user actuating a control on the remote controller that causes the light-measuring sensor to take a light measurement. Such a control can be either a soft control presented on a video display or a hard control, such as a physical button or other control. Those skilled in the art will readily appreciate the variety of ways in which step 115 can be performed depending on the type and nature of the various component of autonomous-vehicle-based light-measurement system 200.

At step 120, each light-measurement is stored in a memory 236 associated with autonomous-vehicle-based light-measurement system 200. Memory 236 may be located at any suitable location, such as onboard autonomous vehicle 208 or offboard the autonomous vehicle, such as at a remote controller or other device (laptop computer, desktop computer, smartphone, etc.) that is a local component of autonomous-vehicle-based light-measurement system 200 or on a server remote from the local components of the autonomous-vehicle-based light-measurement system 200. Fundamentally, there is no constraint on where memory 236 is located. Typically, information concerning the light-measurement locations will be stored in memory 236 in association with the light measurements. Such information may include coordinates (e.g., Cartesian coordinates) of each light-measurement location, a location identifier (e.g., a numeral, an alphanumeric code, a name, etc.), or a combination thereof, among others. With the foregoing generalities in mind, following is a detailed example of implementing method 100.

Figure 3:
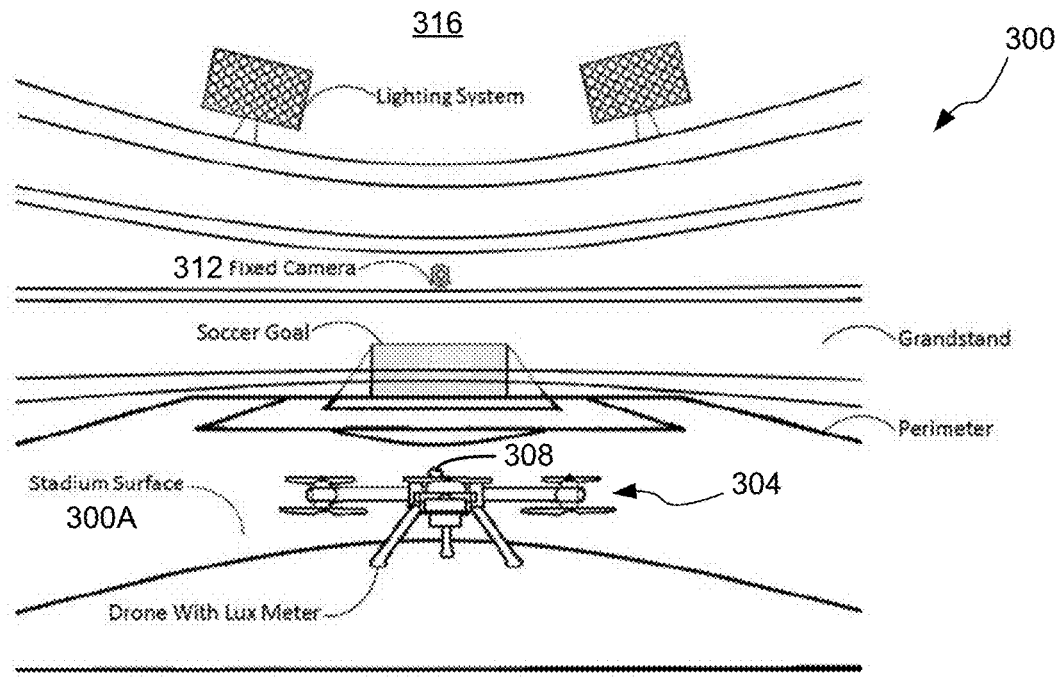
FIG. 3 is a diagram illustrating a light-measurement scenario to measure compliance of stadium illumination with an illumination standard according to embodiments disclosed herein.
Figure 4:
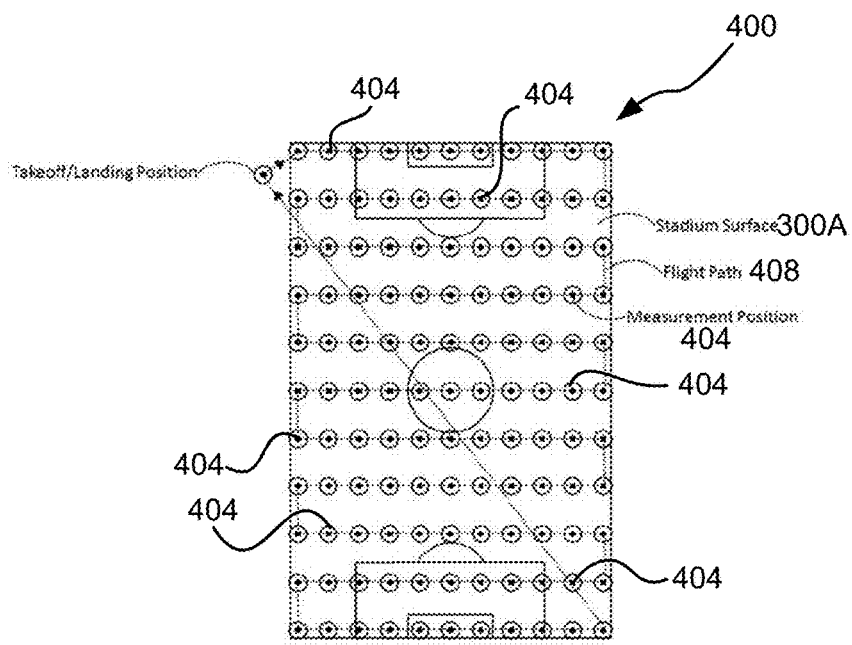
FIG. 4 is a plan view of the playing region of the stadium illustrated in FIG. 3, showing an example of light-measurement positions and a corresponding flight path for the light-measurement drone according to embodiments disclosed herein.

Referring to FIG. 3, in this example method 100 is implemented in the context of a playing surface 300A of a soccer stadium 300 using an aerial drone 304 that carries a lux meter 308. An exemplar of a systematic approach for light measurement of an area is outlined in the FIFA lighting specifications mentioned in the Background section above. In those specifications and as seen in FIG. 4, a grid 400 having a 10 m×10 m cell resolution across playing surface 300A is used as a basis for collecting the light measurements. For a standard version of soccer stadium 300, this typically equates to either 77 (7×11) or 88 (8×11) grid vertices or measurement positions 404 (only a few labeled to avoid clutter). In a conventional light-measuring scheme, a tripod (not shown) is placed at each of these positions with a light sensor mounted (not shown) level to playing surface 300A. A series of measurements are then performed, including: a horizontal measurement at 1 meter above the surface with lux sensor 308 (FIG. 3) pointing upwards perpendicular to playing surface 300A and a vertical measurement at 1.5 meters above the playing surface towards each fixed and field camera point (only one fixed camera 312 shown in FIG. 3). The measured values are then compared to the horizontal and vertical illuminance and uniformity specifications for compliance.

Based on a review of some surveys for several stadiums in Europe, it typically takes fourteen person-hours of manual labor plus two hours of analysis to complete such a survey for the FIFA lighting specifications. Two people are generally required to reduce the time needed for the manual labor component to one working day.

Referring again to FIG. 3, in this example, lux sensor 308 is mounted to aerial drone 304 so that the lux sensor is able to be angled in an unobscured manner towards the sky 316 in a direction perpendicular to playing surface 300A and toward fixed and field cameras (only one fixed camera 316 illustrated around stadium 300. By following an autonomous and systematic flight path 408 (FIG. 4) that traverses measurement positions 404 illustrated in FIG. 4, aerial drone 304 (FIG. 3) is able to rapidly perform a light measurement survey without contacting or interfering with playing surface 300A. Aerial drone 304 can thereby reduce the time, cost and human error/inconsistency associated with current manual approaches, especially for large or high-density surveys.

For example, regarding time, an aerial drone, such as aerial drone 304, can traverse measurement grid 400 (FIG. 4) and angle lux sensor 308 faster than a human. Each measurement can also be performed within a few seconds and automatically recorded with metadata (including localization and tagging information); no manual data recording is required. Height adjustments of lux sensor 308 above playing surface 300A are innately performed by aerial drone 304 faster than manually adjusting a tripod and verifying height. Regarding reduced costs, aside from initial calibration/flight plan setup for stadium 300, aerial drone 304 replaces human labor and may require pre-flight setup, post-flight shutdown, and general oversight during operation in terms of safety, performance, and maintenance. Reduced measurement time also reduces stadium downtime and associated opportunity cost.

In addition, there is no interference to playing surface 300A. Unlike a manual survey, there is no need for physical grid indicators (not shown), and aerial drone 304 does not contact or interfere with playing surface 300A. This is especially relevant when playing surface 300A is being treated, watered, mowed, or marked/painted. Using aerial drone 304 also reduces the risk of human error and can be programmed to repeatedly follow a flight plan and measurement procedure. On the other hand, manual survey results may partly depend on the person (including his/her experience and skill level, procedural preferences, and state of mind) doing the survey.

In some embodiments, aerial drone 304 is used as a positioning and angle-measuring tool with telemetry and digital flight plan storage. Aerial drone 304 may include one or more of a variety of onboard sensors (not shown), such as one or more positioning sensors (e.g., a global positioning system (GPS) sensor, a local reference sensor, etc.), a compass, and an inertial-measurement unit (IMU), among others, that can be additionally used to measure grid 400 (FIG. 4) of measurement positions 404 and camera angles to create a flight plan for a new stadium. The flight plan can be digitally stored and thereafter remain static until an associated stadium change is made. Therefore, no additional measurement tools are needed. Conversely, the manual approach requires tools to measure the grid and angles every time.

Light measurements with varying height/altitude specifications are innately accomplished by an aerial drone. Flight paths for a rotary-wing drone, such as aerial drone 304, are not dependent on turning circle and kinodynamic constraints like a mobile robot's locomotion mechanism. Thus, a flight plan need not be coupled to a particular drone platform, thereby offering hardware flexibility. While a terrestrial mobile robot can alternatively be used in the scenario of FIG. 3, the mobile robot's physical contact with the ground can have a destructive effect. In addition, an aerial drone, such as aerial drone 304, can be more easily transported than a terrestrial robot.

Figure 5:
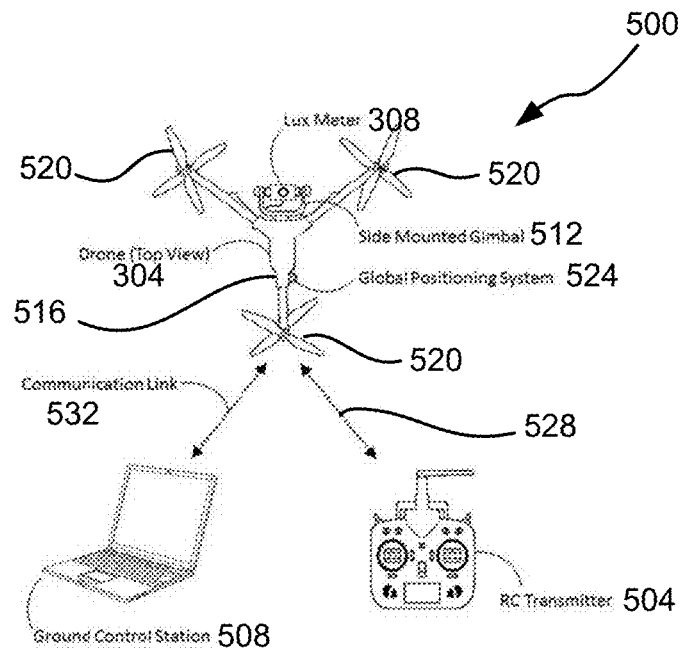
FIG. 5 is a diagram of an aerial-drone-based light-measurement system that can be used, for example, in the light-measurement scenario of FIG. 3, according to embodiments disclosed herein.

FIG. 5 illustrates an example system configuration 500 for implementing a light-measurement plan using aerial drone 304 of FIG. 3. In this example, system configuration 500 includes three components, aerial drone 304, a radio-control (RC) transmitter 504, and a ground control station (GCS) 508. As mentioned above, aerial drone 304 has a light sensor, here lux sensor 308, which can be stably angled, for example and under appropriate control, directly vertically upward and towards each of the fixed and field cameras (see, e.g., fixed camera 312 of FIG. 3) located around stadium 300. This can be achieved by attaching lux sensor 308 to a side-mounted gimbal mount 512, versus the common underslung gimbal mount, to ensure that the sensor's field-of-view is unobstructed by the airframe 516 and other parts (including, for instance, propellers 520) of aerial drone 304. Other possible options (not shown) include, but are not limited to: using a top- or side-mounted camera, with or without a gimbal, which can be used to quantify illuminance via image processing and using multiple fixed light sensors mounted at the required angles. Drawbacks of the latter option, however, is that while, for example, FIFA recommends a 30° elevation angle above the horizontal plane for measuring to fixed cameras, such as fixed camera 312 of FIG. 3, the angle requirements may be different for different sports or other events, geographic regions and authorities, and, secondly, the true elevation angle to a fixed camera changes depending on sensor position. Thus, this option may not be as flexible under certain circumstances.

As noted above, in this example aerial drone 304 is also fitted with sensors for localization, including, for example, a GPS 524, compass (not illustrated) and an inertial-measurement unit (IMU) (not illustrated), comprising a combination of accelerometers and gyroscopes. There may be, in some embodiments, multiple onboard communication transceivers (not shown), such as, but not limited to, two, three, four, or more. A first one of such communication transceivers links, via communication link 528, to RC transmitter 504 to enable manual pilot control, safety override, telemetry view, arm/disarm and other possible mode controls (such as autonomous flight plan engagement/disengagement). A second one of the onboard communication transceivers links, via communication link 532, to GCS 508, which may run on a personal computer, a tablet computer, a smartphone, or other device having a graphical user interface. In this example, GCS 508 is used to: configure aerial drone 304 (setting, for example, autonomous functionality parameters, flying characteristics, geofence, and other fail-safes); create, store and load a flight plan (part of the measurement plan); monitor the drone via telemetry; and store sensor data for analysis.

Figure 6:
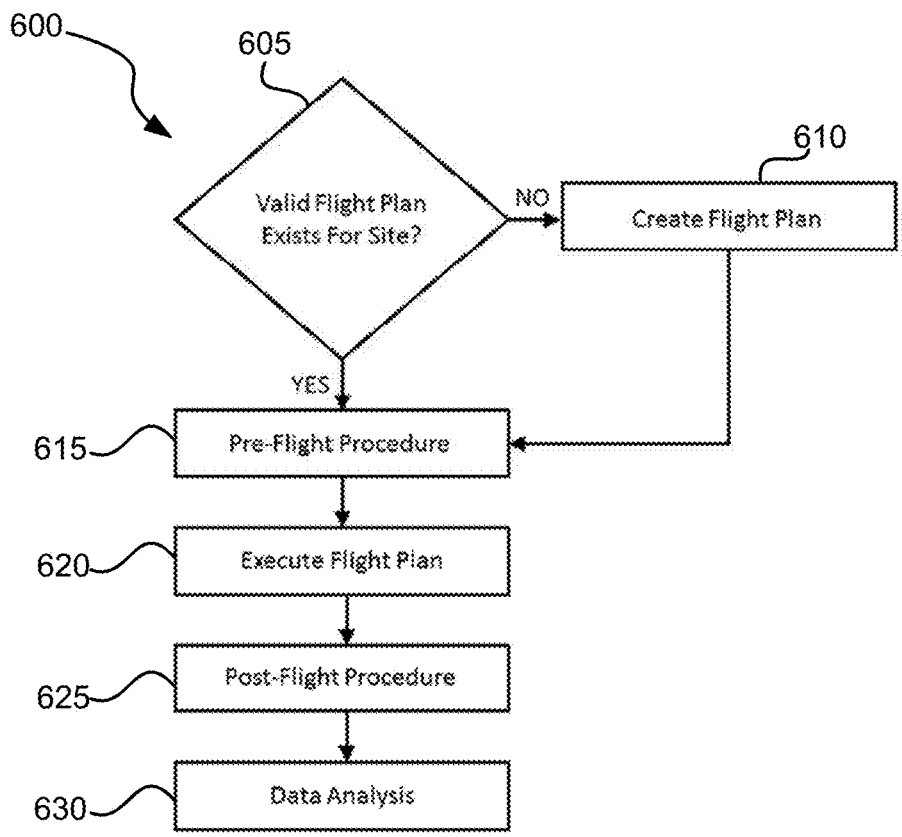
FIG. 6 is a flow diagram of a method of operating the aerial-drone-based light-measurement system of FIG. 4 according to embodiments disclosed herein.

FIG. 6 illustrates a high-level method 600 for operating aerial drone 304 (FIGS. 3 and 5). At step 605, it is decided whether or not a measurement plan needs to be created for a particular stadium. If a measurement plan creation method, such as the method described below, has not yet been used for the stadium to be surveyed, or if a measurement plan has been created but the relevant configuration parameters, including surface geometry and fixed camera positions, have changed, then a measurement plan needs to be created at step 610. Otherwise, the preexisting digital measurement plan is loaded in a pre-flight procedure at step 615. Other pre-flight tasks may include: charged battery installation, sensor calibration, safe takeoff positioning, system checks, and safety procedures. Aerial drone 304 (FIGS. 3 and 5) is then armed, and autonomous flight engaged. Aerial drone 304 takes off, executes the measurement plan at step 620 and lands. At step 625, a post-flight procedure is performed. The post-flight procedure may include: disarming aerial drone 304, performing system checks, and shutting down. At step 630, data analysis and reporting of results may be performed.

Figure 7:
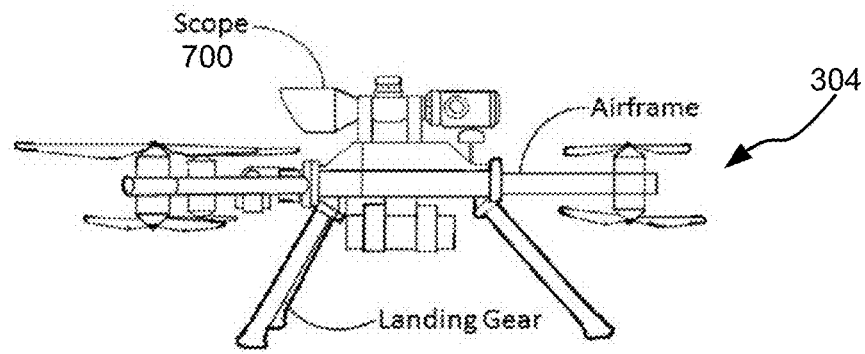
FIG. 7 is a side view of an aerial drone assembly that can be used, for example, in the light-measuring scenario of FIG. 3, according to embodiments disclosed herein.

In one example, the measurement plan can be created by first using aerial drone 304 (FIGS. 3 and 5) as a positioning and angle measuring tool. Referring to FIG. 7, to systematically align aerial drone 304 to each fixed and field camera (see, e.g., fixed camera 312 of FIG. 3), a scope 700 or other sighting system can be first mounted to aerial drone 304 and its mounting position and orientation, relative to the drone's coordinate system (see FIG. 4), calculated. FIG. 7 depicts scope 700 mounted to the top of aerial drone 304, allowing the aerial drone to be held and aimed in a manner similar to holding a rifle. A user can then look through scope 700 and orient aerial drone 304 to bring a targeted camera (such as fixed camera 312) into view/coaxial alignment. The resulting telemetry data provides the absolute yaw and pitch angle to the camera with respect to the absolute position of aerial drone 304. A button, switch, or other device (none shown) can also be used to aid in tagging telemetry data when aimed for later identification in the telemetry log. Note that the roll angle of aerial drone 304 is used to correct the yaw and pitch angle calculations and is not otherwise recorded in the measurement plan, as during flight the aerial drone is held level with the ground while taking light measurements.

In an example, to programmatically calculate a flight path for a rectangular surface, aerial drone 304 is used to measure the absolute position of at least three corners of playing surface 300A (FIG. 3) using a positioning sensor, such as a GPS sensor or local reference sensor, possibly data fused with other localization sensor(s) (for instance, IMU). At each of these corners, the yaw and pitch angles to each fixed and field camera (such as fixed camera 316 of FIG. 3) are also measured. GCS 508 (FIG. 5) may then use the corner positions to calculate the perimeter of playing surface 300A and grid 400 (FIG. 4) of measurement positions 404 (e.g., in terms of GPS waypoints), and the GCS may use the associated sets of angle measurements to calculate the drone yaw/rudder angle and gimbal angle at each measurement position for each measurement. The altitude of aerial drone 304 (FIGS. 3, 5, and 7) at each measurement position 404, similar to the case with the manual approach, can typically be obtained by way of best practices. As noted above, FIG. 4 illustrates example flight path 408. In the present example, aerial drone 304 stops at each measurement position 404, adjusts its yaw and/or gimbal angle to take each measurement, records the measurements, and then moves to the next measurement position. Note that if measurements are required at different altitudes (i.e., heights above playing surface 300A (FIG. 3), it may be advantageous in terms of power consumption for aerial drone 304 to fly the entirety of flight path 408 (FIG. 4) for each altitude rather than making altitude shifts at every measurement position.

Upon executing a measurement plan or thereafter, software, in this example aboard GCS 508 (FIG. 5), can be used to analyze the stored light measurements and telemetry data. Forms of analysis and reporting may include any one or more of the following, among others: tabulated illumination readings, possibly divided according to some dimension (for instance, a fixed or field camera); statistical analysis; problem/anomaly detection; and graphical charts.

Figure 8:
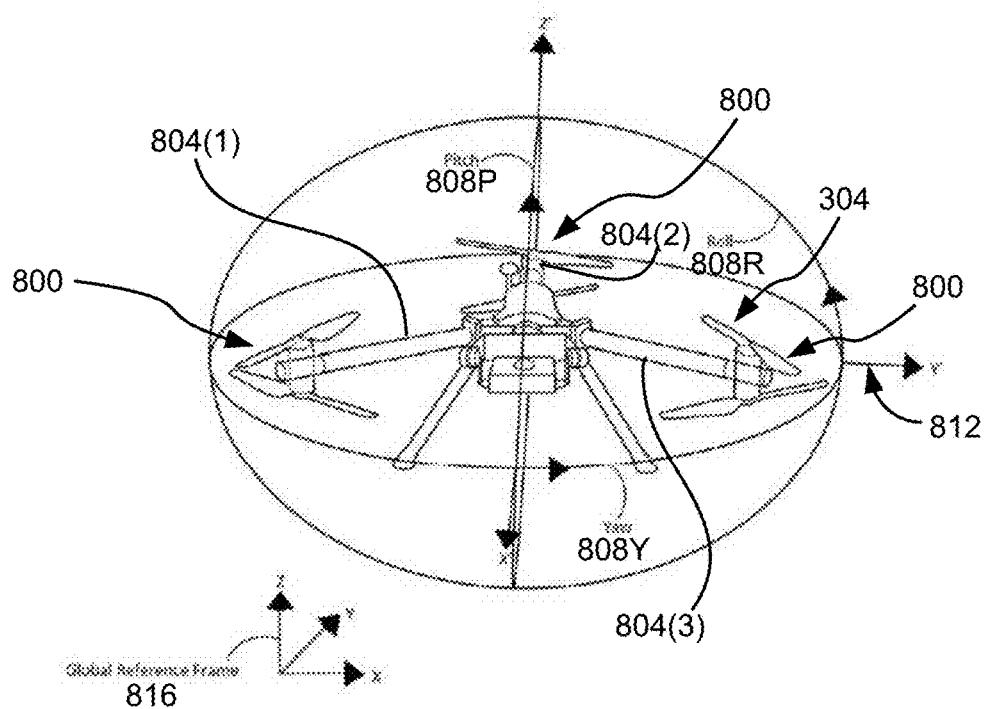
FIG. 8 is a perspective view of the aerial drone assembly of FIG. 7, illustrating various aspects of the assembly, according to embodiments disclosed herein.

Although many shapes are possible, aerial drone 304 (FIGS. 3, 5, and 7) shown in the drawings has an uncommon "Y6" airframe configuration with a side-mounted gimbal mount 512, which provides an unobstructed 180° vertical field-of-view and, thus, the flexibility to measure at any angle. As noted above, scope 700 (FIG. 7), for use in the flight path setup procedure, is mounted to the top of aerial drone 304 and functions similar to a rifle scope. As seen in FIG. 8, a duel propeller system 800 per arm 804(1) to 804(3) is used for redundancy and safety. FIG. 8 also illustrates a set of roll, pitch, and yaw axes 808R, 808P, and 808Y, respectively, as well as exemplar local and global reference frames 812 and 816, respectively.

As an alternative to the aerial-drone-based approach of the foregoing example and as mentioned above, a terrestrial mobile robot can be used. A disadvantage of using a terrestrial mobile robot is the physical contact with playing surface 300A (FIG. 3) and potential ground damage. The risk of damage depends on the locomotion mechanism and may increase with speed, especially when turning (as is the case, for instance, with skid steering). Another disadvantage is that if the survey requires light measurements at varying heights/altitudes above the ground, a robot may need to employ a motorized mechanism to achieve this capability, in a limited sense. That is, not all heights will be achievable. Also, transportation of a terrestrial mobile robot, which is generally larger and heavier than an aerial drone, to/from a stadium or other targeted space may be more cumbersome.

A typical advantage of a terrestrial mobile robot, on the other hand, is larger payload and operating time. The former means that potentially a more comprehensive light-measuring sensor or set of sensors, for example, a spectrophotometer that measures light intensity as a function of wavelength, can be employed more readily. Also given an aerial drone's spinning propellers and free-falling weight upon failure, a terrestrial mobile robot can be safer.

A method of using a terrestrial mobile robot would be similar to that outlined above but with some distinct differences. For example, instead of a flight path, a ground path would need to be devised that takes into consideration any turning circle and kinodynamic constraints of the particular locomotion mechanism used. Thus, unlike a rotary-wing aerial drone, a ground path would be closely coupled to a particular robot platform resulting in less hardware flexibility, especially when considering a universal approach. Another difference concerns the light-measuring sensor mount and angle and height control. The light-measuring sensor may need to be mounted on a turret, gimbal, robot arm, and/or other motorized mechanism to provide the required control. A further difference is in the initial ground path setup. While a person can typically carry an aerial drone easily for use as a position and angle measuring tool, a terrestrial mobile robot may not be as easily or quickly moved manually. However, in both the aerial drone and terrestrial mobile robot cases, using birds-eye imagery, for example, satellite imagery, and on-board sensor(s) that can measure angles to stadium cameras using image processing (passive approach) or beacon detection (requiring infrastructure) can be beneficial in terms of a more automated setup.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
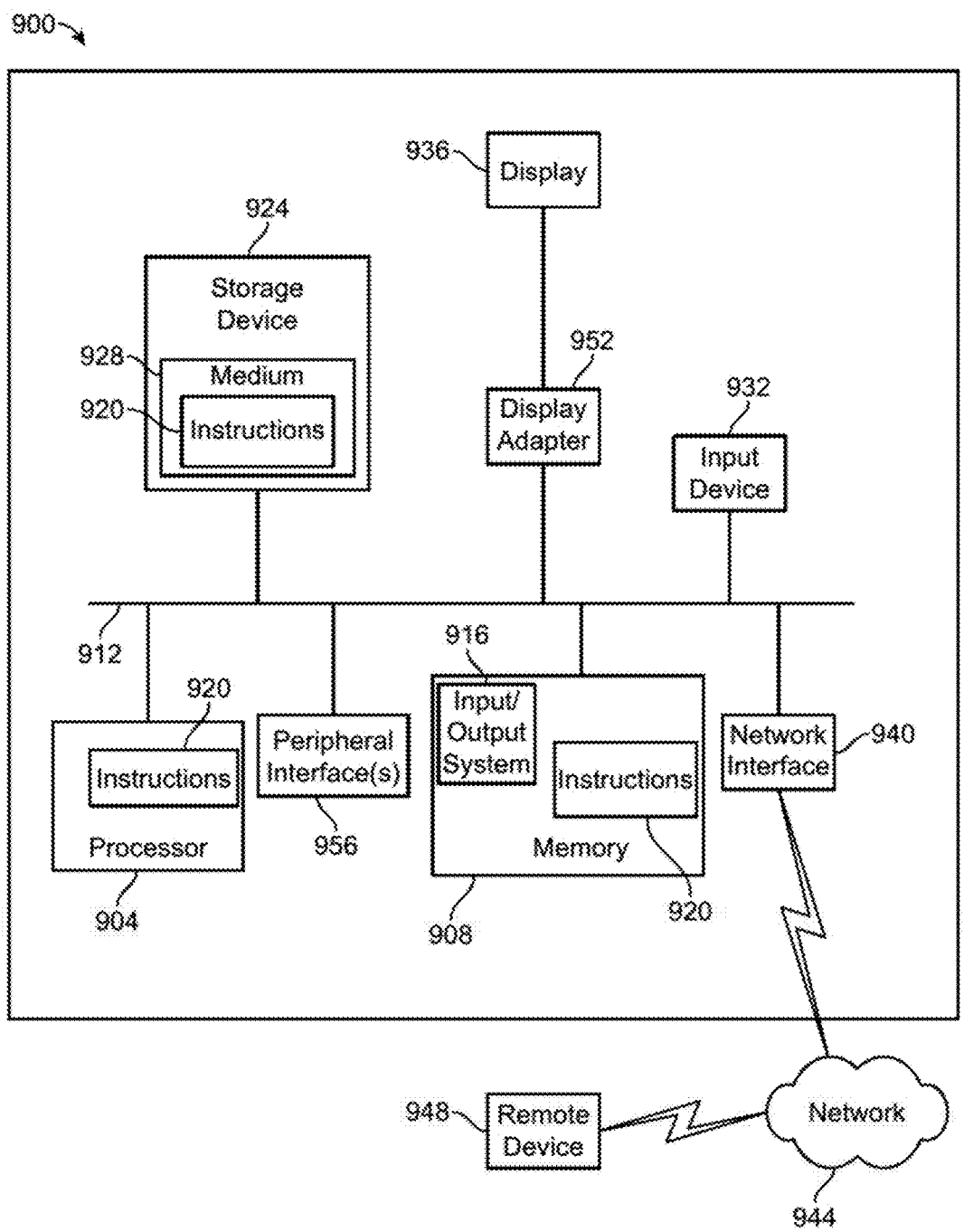
FIG. 9 is a high-level diagram of a computer system that can be used to implement any one or more of the computer-based devices and systems according to embodiments disclosed herein.

FIG. 9 shows a diagrammatic representation of one embodiment of a computing device in the example form of a computer system 900 within which a set of instructions may be executed for causing a system, such as any one or more of systems 200, 216, and 500 of FIGS. 2 and 5, and/or portion(s) and/or combinations thereof, to perform any one or more of the aspects and/or methodologies of the present disclosure, such as method 100 of FIG. 1 and method 600 of FIG. 6. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Memory 908 may include various components (e.g., machine-readable media) including, but not limited to, a random access memory component, a read-only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s) or smart cellphone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A method of taking light-measurement readings within a targeted space, comprising:
    receiving, for deployment of an autonomous vehicle having a lux sensor, a light-measuring plan that includes an identification of a plurality of measurement positions for the autonomous vehicle in the targeted space; wherein the light-measuring plan includes a path traversing the measurement positions; and wherein the autonomous vehicle comprises a scope mounted thereon;
    determining a mounting position and orientation of the autonomous vehicle by aligning the scope with a sensor external to the autonomous vehicle prior to executing the light-measuring plan;
    causing the autonomous vehicle to automatically move to each of the measurement positions based on the light-measuring plan;
    causing the lux sensor to capture the lux measurement at each of the measurement positions while the autonomous vehicle is at the corresponding one of the measurement positions based on the light-measuring plan; and storing, for each measurement position, the lux measurement taken at that position and information identifying that position.

2. The method of claim 1, wherein the targeted space has a lighting specification that includes the plurality of measurement locations and a corresponding target lux measurement value at each of the measurement locations.

3. The method of claim 2, further comprising automatically comparing each lux measurement taken to the corresponding target lux measurement value.

4. The method of claim 1, wherein the autonomous vehicle comprises an aerial vehicle and the light-measuring plan includes a flight path for the aerial vehicle that traverses a path that includes the plurality of measurement positions.

5. The method of claim 1, wherein the autonomous vehicle comprises a terrestrial vehicle and the light-measuring plan includes a terrestrial route that traverses a path that includes the plurality of measurement positions.

6. The method of claim 1, wherein the autonomous vehicle comprises a watercraft and the light-measuring plan includes a water-based route that traverses a path that includes the plurality of measurement positions.

7. The method of claim 1, further comprising moving the autonomous vehicle to each of the measurement positions using realtime positioning information.

8. The method of claim 1, further comprising moving the autonomous vehicle to each of the measurement positions based on a local positioning reference.

9. The method of claim 1, further comprising controlling at least one of the autonomous vehicle and a movable mount to achieve an aim for lux sensor.

10. A non-transitory machine-readable storage medium containing machine-executable instructions configured to cause a processor of a lux measurement system to perform operations comprising:
    receiving, for deployment of an autonomous vehicle having a lux sensor, a light-measuring plan that includes an identification of a plurality of measurement positions for the autonomous vehicle; wherein the light-measuring plan includes a path traversing the measurement positions; and wherein the autonomous vehicle comprises a scope mounted thereon;
    determining a mounting position and orientation of the autonomous vehicle by aligning the scope with a sensor external to the autonomous vehicle prior to executing the light-measuring plan;
    causing the autonomous vehicle to automatically move to each of the measurement positions;
    causing the lux sensor to automatically capture the lux measurement at each of the measurement positions while the autonomous vehicle is the corresponding one of the measurement positions; and
    storing, for each measurement location, the lux measurement taken at that position and information identifying that position.

11. The machine-readable storage medium of claim 10, wherein the targeted space has a lighting specification that includes the plurality of measurement locations and a corresponding target lux measurement value at each of the measurement locations.

12. The machine-readable storage medium of claim 11, wherein the operations further comprise automatically comparing each lux measurement taken to the corresponding target lux measurement value.

13. The machine-readable storage medium of claim 10, wherein the autonomous vehicle comprises an aerial vehicle and the light-measuring plan includes a flight path for the aerial vehicle that traverses a path that includes the plurality of measurement positions.

14. The machine-readable storage medium of claim 10, wherein the autonomous vehicle comprises a terrestrial vehicle and the light-measuring plan includes a terrestrial route that traverses a path that includes the plurality of measurement positions.

15. The machine-readable storage medium of claim 10, wherein the autonomous vehicle comprises a watercraft and the light-measuring plan includes a water-based route that traverses a path that includes the plurality of measurement positions.

16. The machine-readable storage medium of claim 10, wherein the operations further comprise causing the autonomous vehicle to move to each of the measurement positions using realtime positioning information.

17. The machine-readable storage medium of claim 10, wherein the operations further comprise causing the autonomous vehicle to move to each of the measurement positions based on a local positioning reference.

18. The machine-readable storage medium of claim 10, wherein the operations further comprise controlling at least one of the autonomous vehicle and a movable mount to achieve an aim for lux sensor.

19. A light-measuring system to take light measurements within a targeted space, the system comprising:
    an autonomous vehicle that includes a locomotion system capable of moving the autonomous vehicle so that it traverses a path that includes measurement positions within the targeted space; and wherein the autonomous vehicle comprises a scope mounted thereon;
    a lux sensor deployed on the autonomous vehicle to acquire the lux measurement at each of the measurement positions; and
    a measurement-plan system configured to implement a measurement plan to acquire the lux measurements at the measurement positions, wherein the measurement-plan system is further configured to determine a mounting position and orientation of the autonomous vehicle by aligning the scope with a sensor external to the autonomous vehicle prior to executing the measurement-plan system; wherein the measurement-plan system comprises:
    navigation instructions configured to cause the locomotion system to move the autonomous vehicle so that it traverses the path; and
    sensor instructions configured to cause the lux sensor to capture the lux measurement at each of the measurement positions.

20. The light-measuring system of claim 19, wherein the autonomous vehicle comprises an aerial vehicle, and the locomotion system comprises hovering capability.

21. The light-measuring system of claim 19, wherein the autonomous vehicle comprises one of a terrestrial vehicle and a watercraft.

22. The light-measuring system of claim 19, wherein the autonomous vehicle further comprises a global positioning system receiver, and the navigation instructions cause the locomotion system to move the autonomous vehicle so that it traverses the path based on global positioning system information acquired by the global positioning system receiver.

23. The light-measuring system of claim 19, wherein the autonomous vehicle further comprises a positioning system that permits the autonomous vehicle to identify each measurement position based on a local positioning reference.

24. The light-measuring system of claim 19, wherein the lux sensor is movably mounted to the autonomous vehicle, and the sensor instructions include instructions to move the lux sensor relative to the autonomous vehicle.

* * * * *